Patented Dec. 22, 1925.

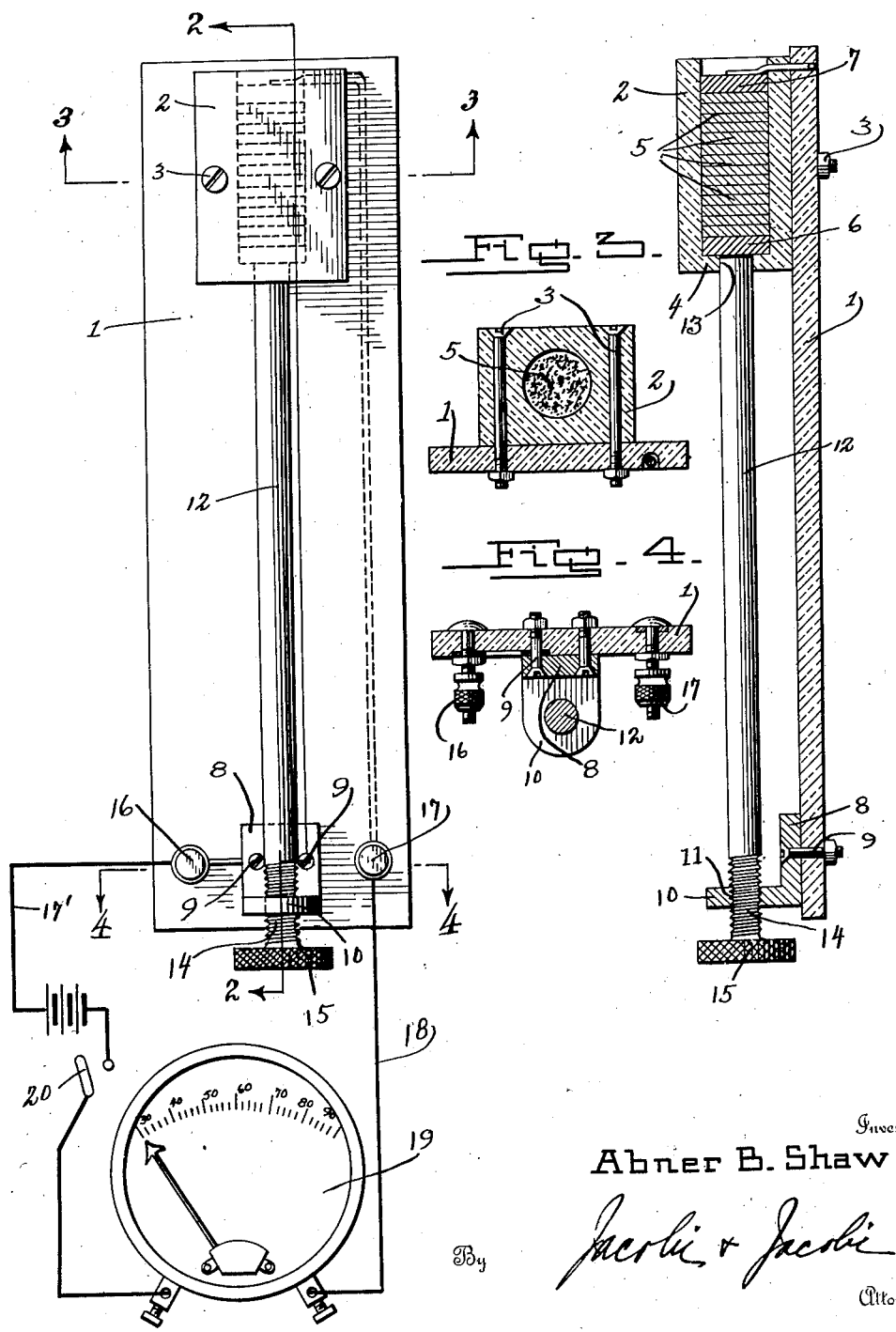

1,566,347

UNITED STATES PATENT OFFICE.

ABNER B. SHAW, OF NORTH DARTMOUTH, MASSACHUSETTS.

TEMPERATURE-INDICATING DEVICE.

Application filed September 15, 1923. Serial No. 662,944.

*To all whom it may concern:*

Be it known that ABNER B. SHAW, a citizen of the United States, residing at North Dartmouth, in the county of Bristol and State of Massachusetts, has invented certain new and useful Improvements in Temperature-Indicating Devices, of which the following is a specification.

This invention relates to a temperature indicating device and has for its principal object to provide a simple and efficient device which will enable a person to ascertain the temperature of a desired place which is at a point distant from the location of the indicating member.

Another important object of the invention is to provide a temperature indicating device of the above mentioned character, which is of such a construction as to enable the same to be readily and quickly placed in an operative position and does not require the operation of several complicated parts in order to determine or ascertain the temperature of a certain room wherein one of the elements of the device is located.

A still further object of the invention is to provide a temperature indicating device which is especially adapted for use in connection with greenhouses, storage houses, apartments and the like wherein the temperature of such places may be readily ascertained by a person at a point distant from such places and wherein is located the indicating device which will enable the person to readily ascertain the temperature so as to permit him to control the heat in said places so as to obtain the desired temperature.

Another important object of the invention is to provide a temperature indicating device which is electrically operated and is of such a construction as to enable the same to be manufactured at a minimum cost and is furthermore strong and durable and well adapted for the purposes for which it is designated.

Other objects and advantages of this invention will become apparent during the course of the following description.

In the accompanying drawings forming a part of this specification and in which like numerals designate like parts throughout the same:—

Figure 1 is a front elevation of the rheostat showing the same connected to the galvanometer.

Figure 2 is a vertical section taken on line 2—2 of Fig. 1.

Figure 3 is a transverse view taken on line 3—3 of Fig. 1, and

Figure 4 is a transverse sectional view taken on line 4—4 of Fig. 1.

In the drawings wherein for the purpose of illustration is shown the preferred embodiment of my invention, the numeral 1 designates the base of my rheostat forming a part of my invention and is constructed of any suitable non-conducting material, preferably glass, although it is to be understood that any other suitable non-conducting material may be used and I do not wish to limit myself to the particular material used. The base 1 is substantially rectangular in design as more clearly shown in the drawings and is adapted to support thereon the container 2. This container 2 is also formed of a non-conducting material and is secured on the base 1 adjacent one end thereof by a suitable fastening means such as designated by the numeral 3 in the drawings. The container 2 is open at its upper end and is closed at its lower end as shown at 4 in the drawings.

Adapted to be received and supported within the container 2 are the carbon discs 5. At each end of the carbon discs 5 are adapted to be placed the metallic plates 6 and 7 respectively. The metallic plates 6 and 7 are so associated with the carbon discs 5 as to have the lower metallic plate 6 resting on the bottom 4 of the container 2 while the upper metallic plate 7 rests on the uppermost of the carbon discs 5 as more clearly shown in Fig. 2 of the drawings. These discs 5 are so arranged in the container 2 as to permit the longitudinal movement thereof as is also the upper metallic plate 7, the purpose of which will be hereinafter more fully described.

At the opposite end of the support of the base 1 is secured the supporting bracket 8, the same being supported upon the lower portion of the base 1 by any suitable fastening means such as is shown at 9 in the drawings and this supporting bracket 8 is provided with an angular extension 10 extending substantially at right angle to the base 1 and this extension 10 is provided with a centrally threaded aperture 11. Adapted to extend longitudinally on the base 1 and through the apertured extension 11 is the brass rod 12. The upper free end of the brass rod 12 is adapted to extend through the aperture 13 provided in the bottom 4 of the container 2 and engages the bottom face of the lower metallic plate 6. The lower portion of the brass rod 12 is externally threaded as shown at 14 in the drawings for cooperation with the threaded aperture 11 of the extension, 10 and, is furthermore provided with a knurled handle 15 at the outer end of the brass rod 12 whereby the same may be readily actuated.

Carried by the base 1 adjacent the supporting bracket 8 are the binding posts 16 and 17 respectively. Secured to the binding post 16 is a conducting wire 17' which leads to any suitable source of electrical current and the other binding post 17 is connected by means of the conducting wire 18 to a galvanometer designated by the numeral 19 in the well known manner. As the galvanometer is of the usual construction it is not thought necessary to go in detail as to the construction of the same. It is sufficient to state that the galvanometer is so constructed as to have its indicating face provided with graduations which are to be found in the usually constructed thermometers. It is to be also further understood that the galvanometer 19 is electrically connected to a suitable switch designated by the numeral 20 and this switch 20 may be of any construction such as a push button switch, a snap switch or a blade switch.

The rheostat is placed in any suitable room and the galvanometer is located at a point which is distant from the location of the rheostat but is located at a suitable place where the person desiring to ascertain the temperature of the room in which the rheostat is located may readily read the galvanometer. As the coefficient of expansion of the brass rod 12 is different from that of the glass base 1 it will be seen that changes in the temperature in the room wherein the rheostat is located will cause proportional changes in the pressure on the carbon discs 5 and as it is a well known fact that resistance offered to an electrical current by a series of carbon discs varies accordingly to the amount of pressure by which they are held in contact with each other the pressure will cause the proportional changes in accordance with the expansion and contraction of the base and rod. By connecting the carbon discs with the electrical circuit and the galvanometer in a manner as heretofore described, as soon as the switch 20 is closed the source of current will pass through the binding post 16, through the supporting bracket 8, the brass rod 12, then up through the metallic plate 6 and the carbon discs 5 and through the uppermost metallic plate 7 and back through the binding post 17 and finally to the galvanometer 19 whereby the source of current flowing through the rheostat 1 will cause the actuation of the galvanometer 19 whereby the indicator in the galvanometer will record the proper temperature of the room wherein the rheostat i located.

The purpose of the brass rod 12 having its lower portion threaded in the supporting bracket 8 and preferably the threaded aperture 11 of the angular extension 10 is to provide means for varying the resistance where by the carbon discs 5 may be either brough closer to each other so as to cut down th resistance thereby permitting a greater flow of current or otherwise cause the carbo discs to separate whereby the resistance i increased and the flow of current is permit ted in accordance with the separation of th carbon discs with each other.

A device of the above mentioned charac ter, is especially useful in a building where in a rheostat is located in each compartmen and the galvanometer is arranged in the er gine room whereby the fireman may readil actuate the switch 20 to ascertain the de sired temperatures in the various apartment This is done by merely glancing at the ga vanometer so as to enable him to control th heat in the compartments. It will thereb be seen that it is not necessary to go in eac room and provide the same with a thermom eter in order to ascertain the temperature c the room and it will therefore save consid erable expense and time as well as providin a simple and efficient means for determinin the temperatures.

The simplicity of my invention enabl the same to be used for various purposes an is of such a construction as to enable th same to be obtained at a minimum cost.

From the foregoing description of th construction of my improved apparatus, will be seen that I have provided a simpl efficient and inexpensive means for carryin out the objects of the invention and whi I have particularly described the elemen best adapted to perform the functions s forth, it is obvious that various changes i form, proportion and in the minor detai of construction may be resorted to, withou departing from the spirit or sacrificing an of the principles of the invention.

What I claim as new and desire to secu by Letters Patent is:—

1. In a temperature indicator, a suppor ing member, a rod mounted thereon and di posed parallel therewith, the supportin member and the rod being of materials c different coefficiency of expansion when e posed to heat of the same temperature, stack of resistor elements resting upon th rod and guided by the supporting memb and electric conductors connected with th stack of resistors and rod respectively.

2. In a temperature indicator, a suppor ing member, a rod mounted thereon and di posed parallel therewith, the supporting member and the rod being of materials of different coefficiency of expansion when exposed to heat of the same temperature, a container mounted upon the supporting member, a stack of resistor elements housed within the container and resting upon the rod, and electric conductors connected with the stack of resistors and the rod respectively.

3. In a temperature indicator, a supporting member, a rod mounted thereon and disposed parallel therewith, the supporting member and the rod being of materials of different coefficiency of expansion when exposed to heat of the same temperature, a container mounted upon the supporting member, a stack of resistor elements housed within the container and resting upon the rod, spring means carried by the container and serving to resiliently hold the stack of resistor elements toward the rod, and electric conductors connected with the stack of resistors and the rod respectively.

In testimony whereof I affix my signature.

ABNER B. SHAW.